United States Patent
Ramaer et al.

(10) Patent No.: US 10,150,422 B2
(45) Date of Patent: Dec. 11, 2018

(54) SPRING FORCE ADJUSTMENT FOR A CONSOLE

(71) Applicant: Inteva Products, LLC, Troy, MI (US)

(72) Inventors: Norbert Ramaer, Kerpen-Blatzheim (DE); Stefan Wiepen, Schwerte (DE); Thilo Brandt, Wuppertal (DE)

(73) Assignee: INTEVA PRODUCTS, LLC, Troy, MI (US)

( * ) Notice: Subject to any disclaimer, the term of this patent is extended or adjusted under 35 U.S.C. 154(b) by 0 days.

(21) Appl. No.: 15/597,497

(22) Filed: May 17, 2017

(65) Prior Publication Data

US 2017/0334325 A1 Nov. 23, 2017

Related U.S. Application Data

(60) Provisional application No. 62/338,659, filed on May 19, 2016.

(51) Int. Cl.
*B60R 7/04* (2006.01)
*B60N 2/75* (2018.01)

(52) U.S. Cl.
CPC ............... *B60R 7/04* (2013.01); *B60N 2/793* (2018.02)

(58) Field of Classification Search
CPC ............... B60R 7/04; B60R 2011/0003; B60R 2011/0007; B60N 2/793
USPC .................................. 296/24.34, 1.09
See application file for complete search history.

(56) References Cited

U.S. PATENT DOCUMENTS

| | | | | | |
|---|---|---|---|---|---|
| 3,926,473 | A | * | 12/1975 | Hogan | B60N 2/793 297/115 |
| 7,114,755 | B1 | * | 10/2006 | Sturt | B60N 3/102 296/24.34 |
| 2010/0102061 | A1 | * | 4/2010 | Hamaguchi | B60N 3/08 220/255 |
| 2014/0265405 | A1 | * | 9/2014 | Appelboum | B60R 7/04 296/24.34 |
| 2016/0339847 | A1 | * | 11/2016 | Kodama | B60R 7/04 |
| 2017/0232902 | A1 | * | 8/2017 | Keller | B60R 7/04 296/24.34 |
| 2017/0306664 | A1 | * | 10/2017 | Saikawa | B60N 3/102 |
| 2017/0334325 | A1 | * | 11/2017 | Ramaer | B60N 2/793 |
| 2018/0100336 | A1 | * | 4/2018 | Choi | E05D 3/02 |

* cited by examiner

*Primary Examiner* — Gregory A Blankenship
(74) *Attorney, Agent, or Firm* — Cantor Colburn LLP

(57) ABSTRACT

A biasing assembly for rotating a lid of a console includes a biasing mechanism operably coupled to the lid at a first end and an adjustable control plate operatively coupled to a second end of the biasing mechanism. Movement of the adjustable control plate with respect to the second end of the biasing mechanism adjusts a biasing force applied to the lid by the biasing mechanism.

20 Claims, 8 Drawing Sheets

SPRING FORCE ADJUSTMENT FOR A CONSOLE

CROSS REFERENCE TO RELATED APPLICATIONS

This application claims the benefit of U.S. Provisional Patent Application Ser. No. 62/338,659 filed May 19, 2016, the entire contents of which are incorporated herein by reference.

TECHNICAL FIELD

Exemplary embodiments of the present invention relate to a storage console for a vehicle and, more particularly, to a mechanism for controlling an opening speed of said storage console.

BACKGROUND

Consoles, such as center consoles in a vehicle for example, are commonly used to store various articles. Various types of consoles exist, including those where the lid includes a single panel that opens on one side, those where the lid includes a single panel that opens at a front, and those where the lid includes two panels that open at a center of the console.

Consoles having two panels that open at a center of the console provide the benefit of allowing a larger opening without requiring a large single cover. However, because the two panels are not operably coupled to one another, the speed at which one of the panels opens may not be the same as the speed at which the other of the panels opens.

Accordingly, while existing consoles are suitable, the need for improvement remains, particularly in providing a mechanism for controlling the speed at which the one or more panels of the console open.

SUMMARY OF THE INVENTION

According to an embodiment, a biasing assembly for rotating a lid of a console includes a biasing mechanism operably coupled to the lid at a first end and an adjustable control plate operatively coupled to a second end of the biasing mechanism. Movement of the adjustable control plate with respect to the second end of the biasing mechanism adjusts a biasing force applied to the lid by the biasing mechanism.

In addition to one or more of the features described above, or as an alternative, in further embodiments the control plate further comprises an opening associated with an engagement feature, wherein the second end of the biasing mechanism is received within the opening and the engagement feature is configured to retain the second end of the biasing mechanism within the opening.

In addition to one or more of the features described above, or as an alternative, in further embodiments movement of the adjustable control plate relative to the second end of the biasing mechanism increases the biasing force by causing the engagement feature to apply a force to the second end of the biasing mechanism in a direction opposite the biasing force.

According to another embodiment, a console includes a base, and an armrest selectively rotatable relative to the base between a closed position and an open position. At least one biasing assembly is associated with the armrest. The at least one biasing assembly includes a biasing mechanism operably coupled to the armrest at a first end and an adjustable control plate operatively coupled to a second end of the biasing mechanism. Movement of the adjustable control plate with respect to the second end of the biasing mechanism adjusts a biasing force applied to the armrest by the biasing mechanism.

In addition to one or more of the features described above, or as an alternative, in further embodiments wherein the biasing force is configured to rotate the armrest to the open position.

In addition to one or more of the features described above, or as an alternative, in further embodiments wherein movement of the control plate is configured to increase the biasing force by applying a force to the second end of the biasing mechanism in a direction opposite the biasing force of the biasing mechanism.

In addition to one or more of the features described above, or as an alternative, in further embodiments the control plate includes an opening and the second end of the biasing mechanism is received within the opening.

In addition to one or more of the features described above, or as an alternative, in further embodiments the control plate includes an engagement feature configured to retain the second end of the biasing mechanism and movement of the control plate causes the engagement feature to engage and apply the force to the second end.

In addition to one or more of the features described above, or as an alternative, in further embodiments wherein the control plate is translatable along an axis to control the biasing force applied to the armrest by the biasing mechanism.

In addition to one or more of the features described above, or as an alternative, in further embodiments the control plate is rotatable about an axis to control the biasing force applied to the armrest by the biasing mechanism.

In addition to one or more of the features described above, or as an alternative, in her embodiments the armrest includes a first panel configured to rotate about a first rotational axis and a second panel configured to rotate about a second rotational axis.

In addition to one or more of the features described above, or as an alternative, in further embodiments a first biasing assembly is associated with the first panel and a second biasing assembly associated with the second panel.

In addition to one or more of the features described above, or as an alternative, in further embodiments the first biasing assembly is configured to rotate the first panel with a first rotational speed and the second biasing assembly is configured to rotate the second panel with a second rotational speed, the first rotational speed and the second rotational speed being substantially identical.

In addition to one or more of the features described above, or as an alternative, in further embodiments the first biasing assembly includes a first biasing mechanism and a first control plate, and the second biasing assembly includes a second biasing mechanism and a second control plate, the first control plate being arranged at a first position relative to the first biasing mechanism, and the second control plate being arranged at a second position relative to the second biasing mechanism.

In addition to one or more of the features described above, or as an alternative, in further embodiments the first position and the second position are different.

According to another embodiment, a console includes a base, a first panel mounted to the base and configured to rotate about a first rotational axis between a closed position and an open position, and a second panel mounted to the base and configured to rotate about a second rotational axis between a closed position and an open position. A first biasing assembly is configured to rotate the first panel and a second biasing assembly configured to rotate the second panel. The first biasing assembly includes an adjustable control plate movable to adjust a rotational speed of the first panel about the first rotational axis such that the rotational speed of the first panel and a rotational speed of the second panel are substantially identical.

In addition to one or more of the features described above, or as an alternative, in further embodiments the first biasing assembly further includes a biasing mechanism having a first end and a second end, the first end being operably coupled to the first panel and the second end being associated with the control plate.

In addition to one or more of the features described above, or as an alternative, in further embodiments the second biasing assembly includes an adjustable control plate movable to adjust a rotational speed of the second panel about the second rotational axis.

In addition to one or more of the features described above, or as an alternative, in further embodiments the base includes an interior cavity and when arranged in the closed position, the first panel and second panel are configured to seal the interior cavity.

In addition to one or more of the features described above, or as an alternative, in further embodiments in the closed position, the first panel and the second panel are generally aligned and in contact with one another.

BRIEF DESCRIPTION OF THE DRAWINGS

Embodiments of the present invention will now be described, by way of example only, with reference to the accompanying drawings in which.

DETAILED DESCRIPTION

Figure 1:
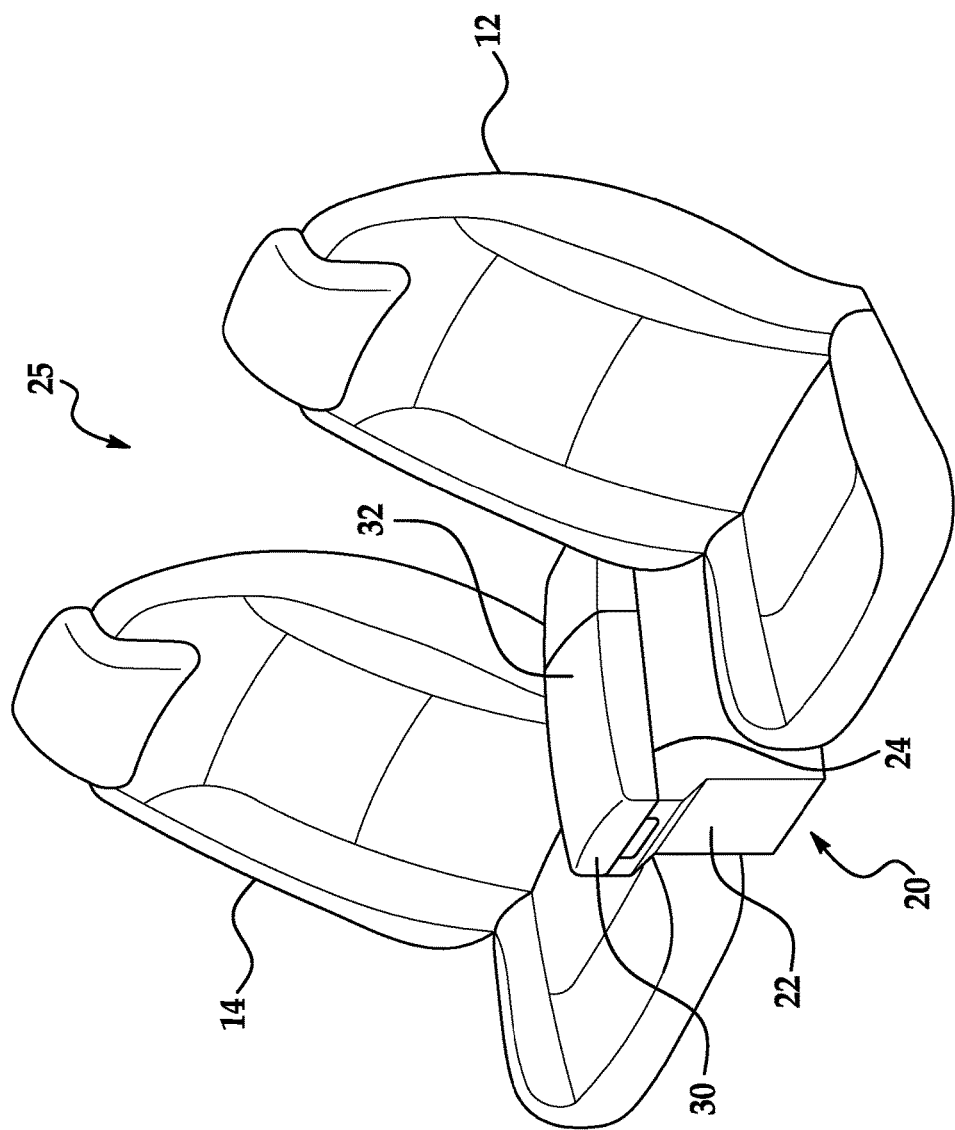
FIG. 1 is a perspective view of two vehicle seats and a console with a movable butterfly armrest according to an embodiment.
Figure 2:
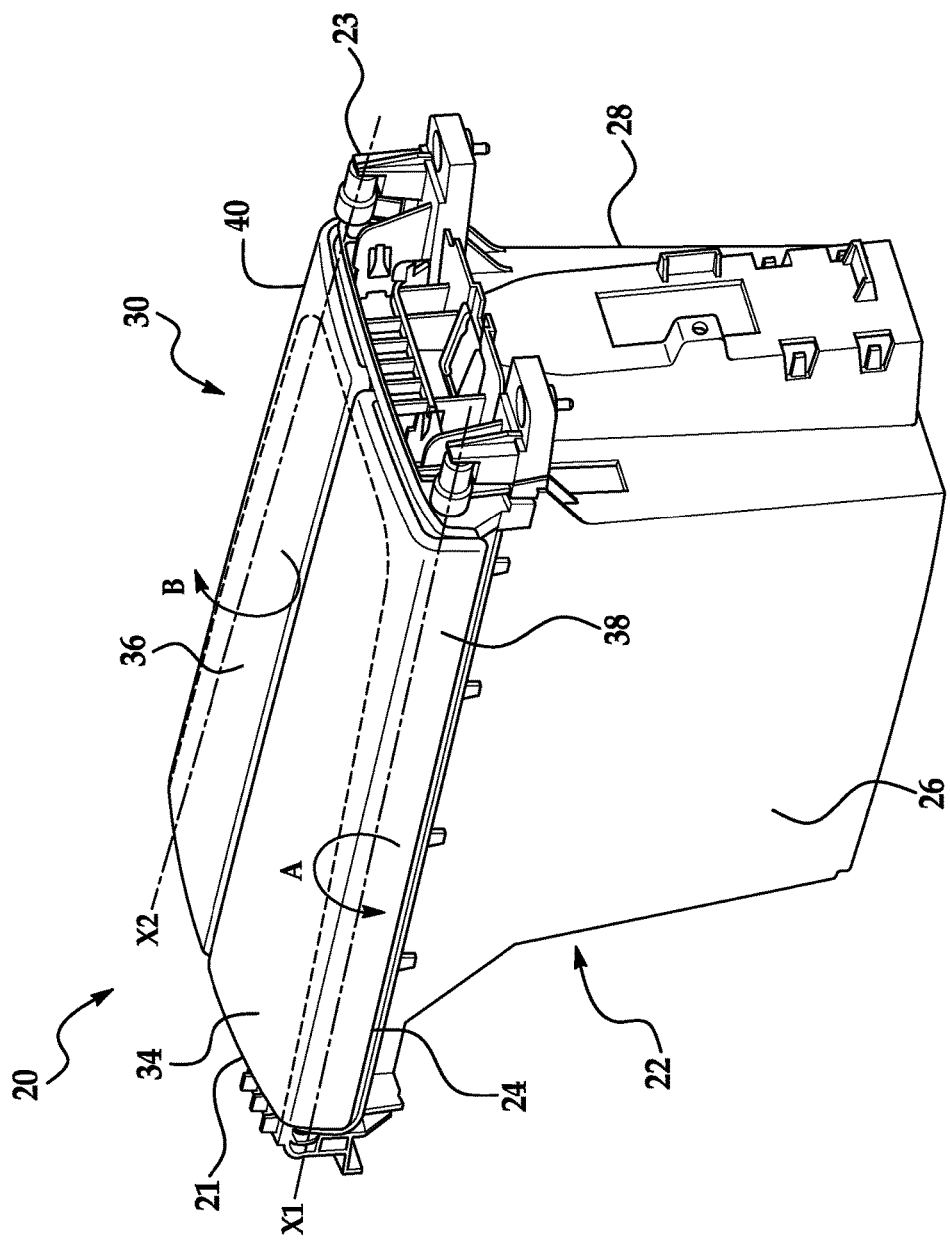
FIG. 2 is a perspective view of an example of a portion of the console of FIG. 1.

Referring to the FIGS. 1 and 2, an example of a console 20 arranged within an interior 25 of a vehicle is illustrated. In the illustrated, non-limiting embodiment, the console 20 is configured as a center console positionable between a driver seat 12 and a front passenger seat 14 within the passenger compartment 10 of a vehicle. Depending on the type of vehicle manufactured, the driver seat 12 and the passenger seat 14 may be reversed. However, it should be understood that embodiments where the console 20 is arranged at another location within a vehicle, such as between rear passenger seats for example, or embodiments where the console 20 is used in another application, are also within the scope of the disclosure.

The console 20 includes a base 22 and an armrest 30 mounted to an upper surface 24 of the base 22 and suitable for use by occupants of the vehicle seats 12, 14. An upper surface 32 of the armrest 30 may, but need not, include a padded surface to improve the comfort of the seat occupants. By positioning the armrest 30 adjacent an open end 24 of the base 22, the armrest 30 functions as a lid to seal an interior cavity 29 (FIG. 3) defined within the base 22. Although the armrest 30 shown in FIG. 1 has a single lid or panel, and an armrest 30 having any number of panels, including a single panel, is contemplated.

Figure 3:
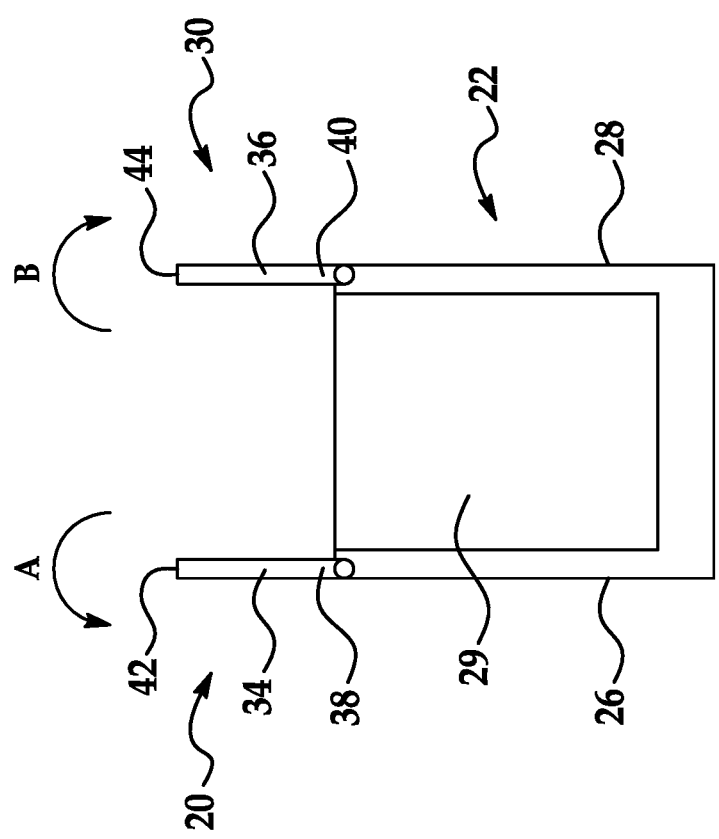
FIG. 3 is a cross-sectional view of the console of FIG. 2 according to an embodiment.
Figure 4:
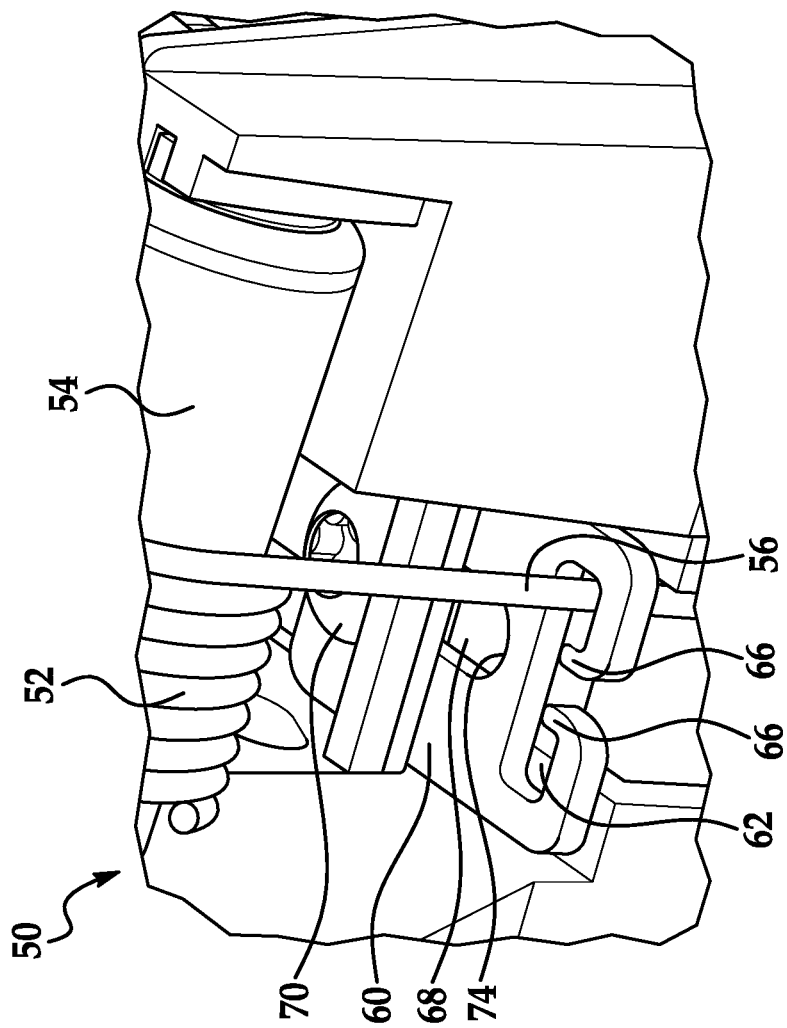
FIG. 4 is a perspective view of a biasing assembly of a console according to an embodiment.

In the illustrated, non-limiting embodiment of FIGS. 2 and 3, the armrest 30 includes a separate first panel 34 and second panel 36 arranged directly adjacent one another. A first side 38 of the first panel 34 is mounted adjacent a first side 26 of the base 22, and a first side 40 of the second panel 36 is mounted adjacent a second, opposite side 28 of the base 22. The first and second panels 34, 36 may be substantially identical, or may be different. As a result, the armrest 30 may be symmetrical about a vertically-oriented plane extending between a front 21 and rear 23 of the console 20, as shown in FIG. 2. It should be understood that the armrest 30 illustrated and described herein is intended as an example only.

The first and second panels 34, 36 are movable relative to the base 22 between a closed position (FIG. 2) and an open position (FIG. 3) to selectively provide access to an interior cavity 29 of the base 22. In embodiments where the armrest 30 includes a plurality of panels, such as a first panel 34 and a second panel 36 for example, each of the panels 34, 36 is configured to move between a respective open and closed position. As shown in FIG. 2, the first panel 34 is configured to rotate about a first rotational axis X1 and the second panel 36 is configured to rotate about a second rotational axis X2. Rotation of the first panel 34 about axis X1 is generally opposite rotation of the second panel 36 about axis X2. In an embodiment, the first axis X1 is arranged generally parallel to the first side 38 of the first panel 34 and the second axis X2 is arranged generally parallel to the first side 40 of the second panel 36. However, embodiments where the first and second rotational axes X1, X2 are arranged at another location, such as adjacent the front 21 and/or rear 23 of the console 20 for example, are contemplated herein. In addition, the first and second rotational axes X1 X2 may, but need not be parallel to one another. However, no interference should occur between the first and second panels 34, 36 during rotation thereof.

When the armrest 30 is in the closed position, the first movable panel 34 and the second movable panel 36 are substantially aligned. In addition, the second sides 42, 44 of each of the first movable panel 34 and the second movable panel 36 may be arranged in contact, or alternatively, may be separated by a clearance. In embodiments where the first and second movable panels 34, 36 are not in direct contact, the clearance arranged there between may be sized to avoid interference between the first and second panels 34, 36 as they transition between the open and closed positions. As a result, the clearance is sufficiently small to restrict access into or out of the interior cavity 29 of the base 22.

Each panel 34, 36 includes one or more biasing assemblies 50 configured to bias rotation of the panel 34, 36 about its corresponding rotational axis X1, X2 to the open position. In one embodiment, the base 22 of the console 20 includes a latching mechanism (not shown) configured to engage and retain each of the panels 34, 36 of the armrest 30 in the closed position. Upon operation of the latching mechanism by an occupant of one of the seats 12, 14, the latching mechanism will release each of the panels 34, 36 removably connected thereto. As a result, the biasing force generated by each biasing assembly 50 will cause a panel 34, 36 connected thereto to rotate about a respective axis X1, X2, to an open position.

With reference now to FIGS. 4-7, an example of a biasing assembly 50 associated with each of the first and second movable panels 34, 36 is illustrated. The biasing assembly 50 includes a biasing mechanism 52 coupled to one of the movable panels 34, 36 and mounted coaxially with the respective rotational axis of the panel, such as about a stationary pin or dowel 54 for example, in the illustrated, non-limiting embodiment, the biasing mechanism 52 is a torsion spring arranged concentrically about the pin 54; however, other types of biasing mechanisms may be used. The biasing member 52 includes a first end 55 (see FIG. 7) and a second end 56, the first end 55 being attached to a corresponding panel 34, 36 to apply a biasing force thereto. As shown in FIG. 3, the biasing member associated with the first panel 34 is configured to bias the panel 34 in a direction indicated by arrow A, and the biasing mechanism associated with the second panel 36 is configured to bias the panel 36 in a direction indicated by arrow B.

A control plate 60 is located at a position beneath the biasing mechanism 52. The control plate 60 may be generally rectangular in shape and is formed from any suitable material, such as sheet metal or plastic for example. The plate 60 includes an opening 62 for receiving the second end 56 of the biasing mechanism 52. In an embodiment, a first end 64 of the control plate 60 includes one or more engagement features 66, such as a hook-shaped feature for example, configured to define a passageway through which the free end 56 of the biasing mechanism 52 may be inserted into the opening 62. The engagement feature 66 is additionally configured to retain the free end 56 of the biasing mechanism 52 within the opening 62.

Figure 5:
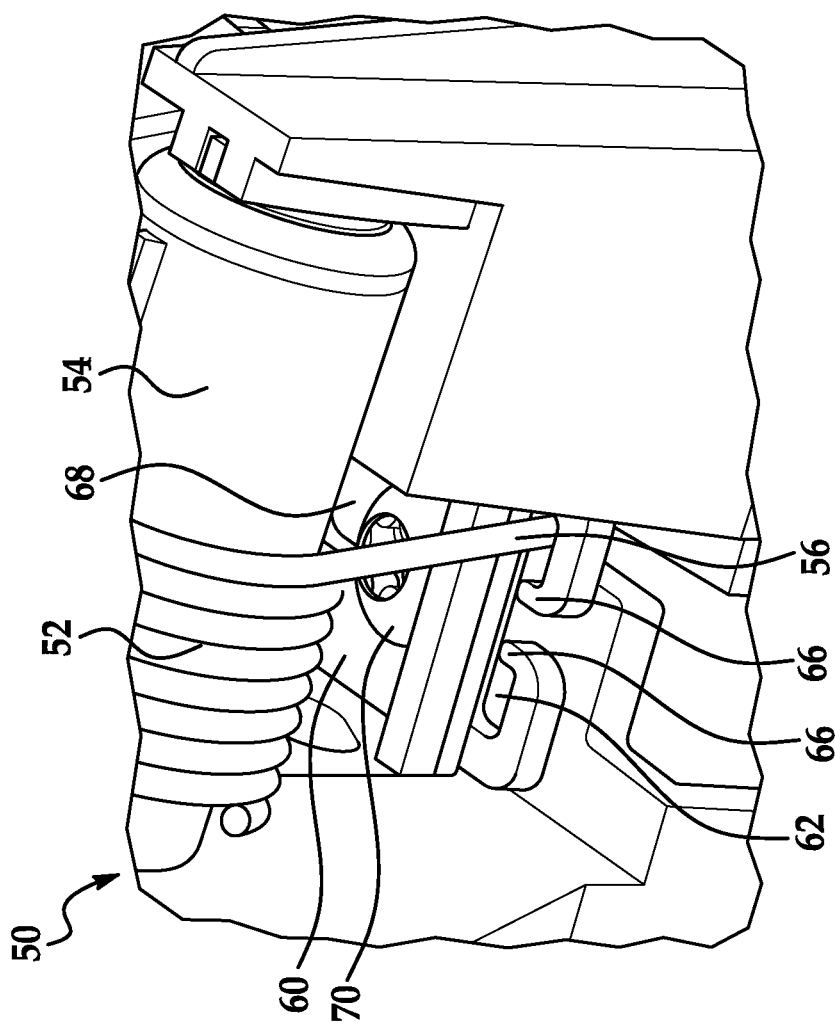
FIG. 5 is a perspective view of a biasing assembly of a console according to an embodiment.
Figure 6:
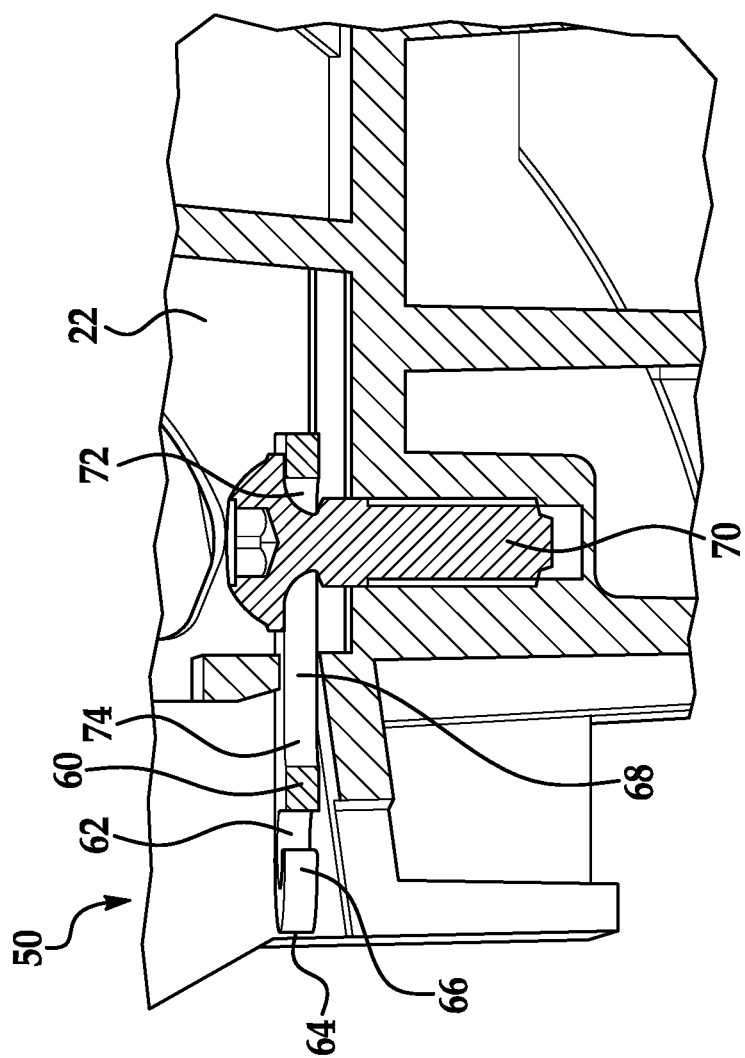
FIG. 6 is a cross-sectional view of the plate of the biasing assembly according to an embodiment.
Figure 7:
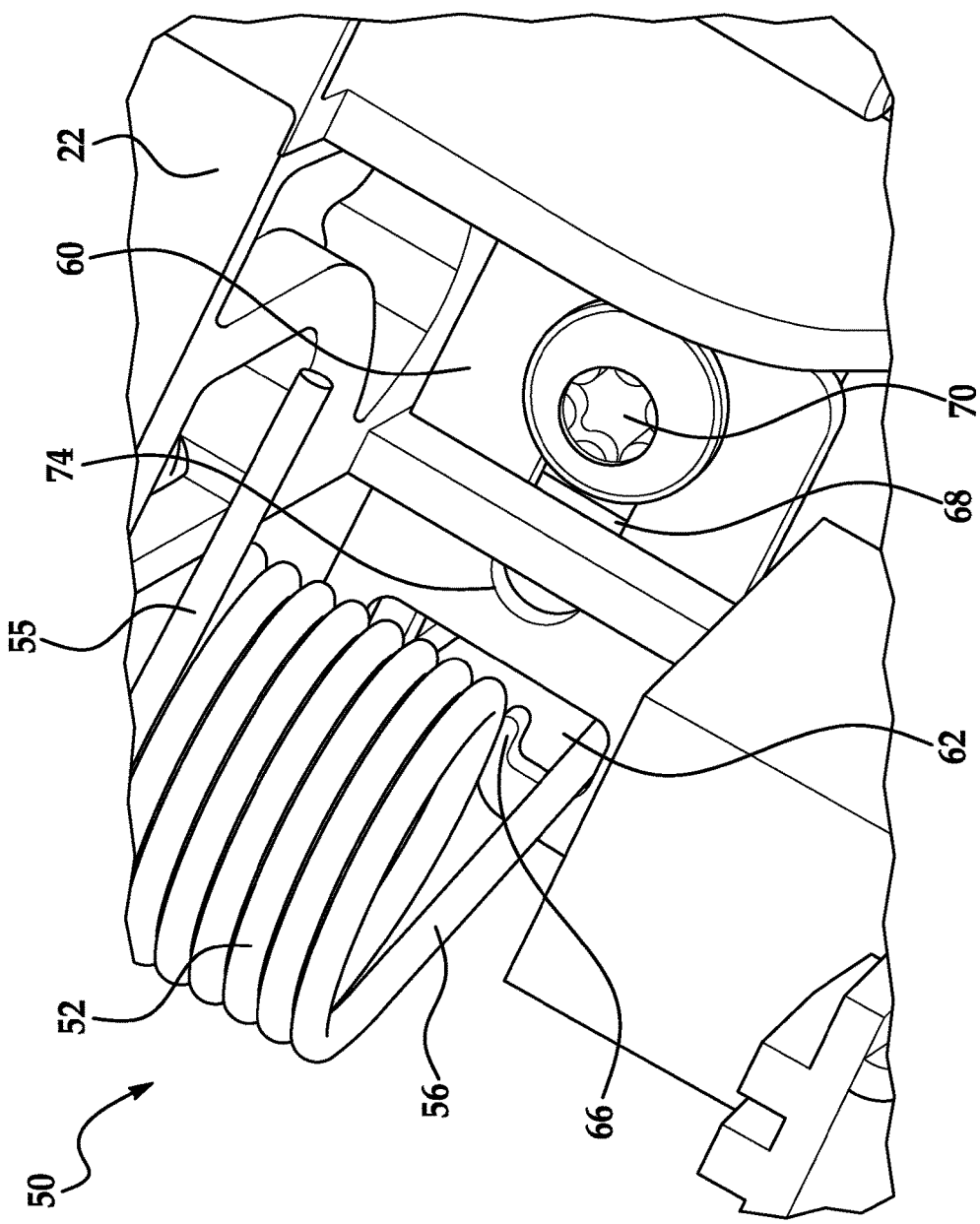
FIG. 7 is a top view of the biasing assembly according to an embodiment.

An elongated slot 68 is formed in the control plate 60. As shown, the elongated slot 68 extends generally perpendicular to the first end 64 and the opening 62; however other configurations of the slot 68 relative to the opening 62 are contemplated herein. A screw or other fastener 70 extends through the elongated slot 68 and is connected to an adjacent portion of the base 22 to limit movement of the plate 60 relative to the base 22. Prior to tightening of the fastener 70, the control plate 60 is slidable in a direction parallel to the rear 23 of the base 22, between a first position and a second position. In the first position, the fastener 70 is arranged adjacent a first end 72 of the slot 68 (FIGS. 4 and 7) and in the second position, the fastener 70 is positioned adjacent a second, opposite end 74 of the slot (FIG. 5).

Figure 8:
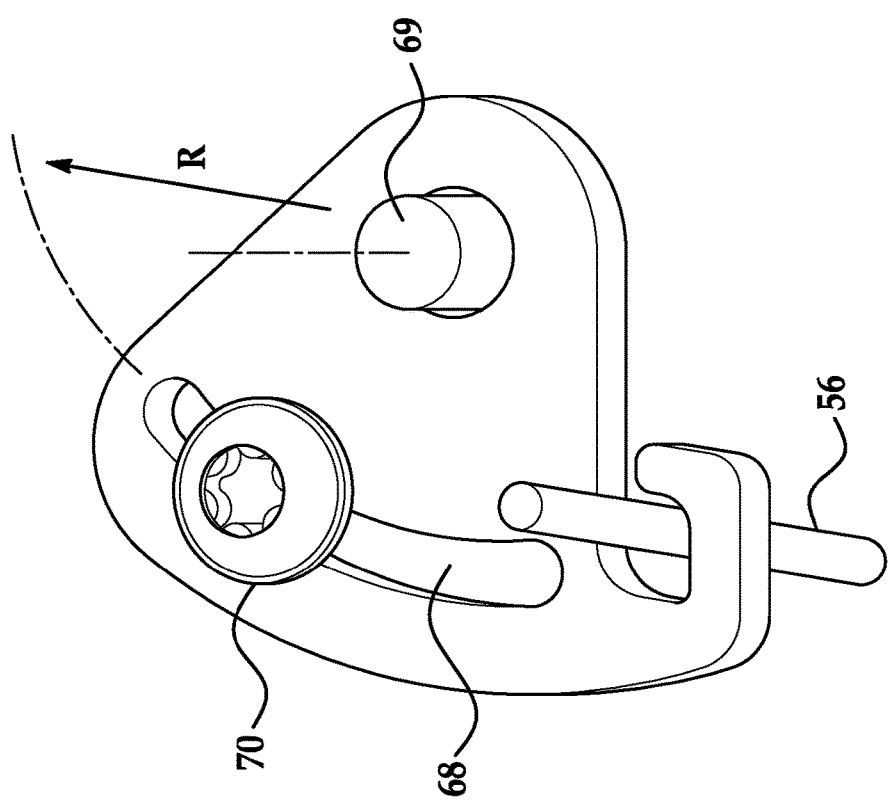
FIG. 8 is a perspective view of a control plate of the biasing assembly according to another embodiment.

In another embodiment, illustrated in FIG. 8, the control plate 60 is rotatable about a pin 69. In such embodiments, the slot 68 formed in the control plate 60 is generally arcuate in shape such that as the control plate 60 rotates about an axis defined by the pin 69, the fastener 70 translates within the slot 68 between a first position and second position. Although the fastener 70 is illustrated as being offset from the axis of rotation of the control plate 60, in other embodiments, the fastener 70 may define the axis of rotation of the control plate 60, thereby eliminating the need for a separate pin 69 and slot 68.

This movement of the control plate 60 relative to the base 22 may be used to control the spring rate of the biasing mechanism 52. When the control plate 60 is mounted to the base 22 in the first position such that the fastener 70 is arranged adjacent the first end 72 of the slot 68, the free end 56 of the biasing mechanism 50 is arranged in a generally neutral position such that the control plate 60 applies no force, or a minimal force thereto via the engagement feature 66. In this position, the biasing mechanism 52 operates in a normal manner as the panel rotates open.

The spring rate of the biasing mechanism 52 may be adjusted by changing the position of the control plate 60 relative to the base 22 and the biasing mechanism 52. As the control plate 60 is slid towards the second position, the engagement feature 66 applies a force to the free end 56, causing the free end 56 to move in a direction opposite the biasing force of the biasing member 52. As a result, the force applied by the engagement feature 66 regulates the biasing force of the biasing member 52, thereby increasing the spring rate and speeding up the rotation of the panel, driven by the biasing mechanism 52, to the open position. In an embodiment, a coating or other surface treatment is applied to the free end 56 of the biasing member 52 to increase the roughness thereof. As a result, the friction between the adjustment control plate and the free end is increased. It should be understood that the control plate 60 may be mounted at any position between the first position and the second position embodiment, the base and/or the adjustable control plate 60 may include a plurality of markings configured to provide a reference to an operator indicating the speed of rotation of the panel when the control plate 60 is located at various positions relative to the base the biasing mechanism 52.

By allowing the control plate to be moved relative to the base 22 and the biasing mechanism 52 prior to its securement, the free end 56 of the biasing mechanism 52 may be retained at a plurality of positions, each being associated with unique biasing properties. As a result, the control plate 60 of the at least one biasing assembly 50 associated with the first panel 34 and the control plate 60 of the at least one biasing assembly 50 associated with the second panel 36 may be adjusted so that the rotational speeds of the first panel 34 and the second panel 36 about their respective axes X1, X2 to an open position are substantially identical. The control plate 60 of the at least one biasing assembly 50 associated with the first panel 34 and the control plate 60 of the at least one biasing assembly 50 associated with the second panel 36 may be located at different relative positions with respect to each other, to achieve matching or equal rotation of the first and second panels 34, 36.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A biasing assembly for rotating a lid of a console, comprising:
   a biasing mechanism operably coupled to the lid at a first end; and
   an adjustable control plate operatively coupled to a second end of the biasing mechanism, wherein movement of the adjustable control plate with respect to the second end of the biasing mechanism adjusts a biasing force applied to the lid by the biasing mechanism.

2. The biasing assembly according to claim 1, wherein the control plate further comprises an opening associated with an engagement feature, wherein the second end of the biasing mechanism is received within the opening and the engagement feature is configured to retain the second end of the biasing mechanism within the opening.

3. The biasing assembly according to claim 1, wherein movement of the adjustable control plate relative to the second end of the biasing mechanism increases the biasing force by causing the engagement feature to apply a force to the second end of the biasing mechanism in a direction opposite the biasing force.

4. A console comprising:
a base;
an armrest selectively rotatable relative to the base between a closed position and an open position; and
at least one biasing assembly associated with the armrest, the at least one biasing assembly including:
a biasing mechanism operably coupled to the armrest at a first end; and
a control plate operatively coupled to a second end of the biasing mechanism, wherein the control plate is operable to control a biasing force applied to the armrest by the biasing mechanism.

5. The console according to claim 4, wherein the biasing force is configured to rotate the armrest to the open position.

6. The console according to claim 4, wherein movement of the control plate is configured to increase the biasing force by applying a force to the second end of the biasing mechanism in a direction opposite the biasing force of the biasing mechanism.

7. The console according to claim 4, wherein the control plate includes an opening and the second end of the biasing mechanism is received within the opening.

8. The console according to claim 4, wherein the control plate includes an engagement feature configured to retain the second end of the biasing mechanism and movement of the control plate causes the engagement feature to engage and apply a force to the second end.

9. The console according to claim 4, wherein the control plate is translatable along an axis to control the biasing force applied to the armrest by the biasing mechanism.

10. The console according to claim 4, wherein the control plate is rotatable about an axis to control the biasing force applied to the armrest by the biasing mechanism.

11. The console according to claim 4, wherein the armrest includes a first panel configured to rotate about a first rotational axis and a second panel configured to rotate about a second rotational axis.

12. The console according to claim 11, wherein the at least one biasing assembly includes a first biasing assembly is associated with the first panel and a second biasing assembly associated with the second panel.

13. The console according to claim 12, wherein the first biasing assembly is configured to rotate the first panel with a first rotational speed and the second biasing assembly is configured to rotate the second panel with a second rotational speed, the first rotational speed and the second rotational speed being substantially identical.

14. The console according to claim 13, wherein the first biasing assembly includes a first biasing mechanism and a first control plate, and the second biasing assembly includes a second biasing mechanism and a second control plate, the first control plate being arranged at a first position relative to the first biasing mechanism, and the second control plate being arranged at a second position relative to the second biasing mechanism.

15. The console according to claim 14, wherein the first position and the second position are different.

16. A console comprising:
a base;
a first panel mounted to the base and configured to rotate about a first rotational axis between a closed position and an open position;
a second panel mounted to the base and configured to rotate about a second rotational axis between a closed position and an open position;
a first biasing assembly configured to rotate said first panel and a second biasing assembly configured to rotate said second panel, wherein the first biasing assembly includes a control plate movable to adjust a rotational speed of the first panel about the first rotational axis such that the rotational speed of the first panel and a rotational speed of the second panel are substantially identical.

17. The console according to claim 16, wherein the first biasing assembly further includes a biasing mechanism having a first end and a second end, the first end being operably coupled to the first panel and the second end being associated with the control plate.

18. The console according to claim 16, wherein the second biasing assembly includes an adjustable control plate movable to adjust a rotational speed of the second panel about the second rotational axis.

19. The console according to claim 16, wherein the base includes an interior cavity and when arranged in the closed position, the first panel and second panel are configured to seal the interior cavity.

20. The console according to claim 16, wherein in the closed position, the first panel and the second panel are generally aligned and in contact with one another.

* * * * *